United States Patent [19]
Alexander

[11] Patent Number: 5,510,136
[45] Date of Patent: Apr. 23, 1996

[54] METHOD OF MAKING BREAD PRODUCTS WITHOUT SHORTENINGS AND/OR OILS

[76] Inventor: Donald J. Alexander, R.R. 1, Box 38, Martin, N. Dak. 58758

[21] Appl. No.: 326,867

[22] Filed: Oct. 21, 1994

[51] Int. Cl.⁶ .............................. A23L 1/10; A21D 2/00; A21D 13/00
[52] U.S. Cl. .............................................. 426/549; 426/21
[58] Field of Search ........................................ 426/549, 21

[56] References Cited

U.S. PATENT DOCUMENTS

| | | | |
|---|---|---|---|
| 4,311,714 | 1/1982 | Goering et al. | 426/52 |
| 4,615,888 | 10/1986 | Zallie et al. | 426/21 |
| 4,690,829 | 9/1987 | Usui | 426/661 |
| 5,024,996 | 6/1991 | Ringe | 426/804 |
| 5,344,663 | 9/1994 | Jewell et al. | 426/549 |

OTHER PUBLICATIONS

Daniel, A. R. Bakery Materials & Methods, 4th Edition McClasen & Sons, LTD, London (1963) pp. 92–93; 113–121.

*Primary Examiner*—Donald E. Czaja
*Assistant Examiner*—Choon P. Koh
*Attorney, Agent, or Firm*—David A. Lingbeck

[57] ABSTRACT

The method of making bread products without animal shortenings and/or vegetable oils comprises substituting waxy barley flour made from processed or unprocessed, hulled or nonhulled waxy barley for shortenings and/or oils. Bread products comprising waxy barley flour less the shortenings and/or oils which were one of the staple ingredients for making bread products, are essentially fat free, have a longer shelf life and are healthier for people than conventional bread products.

5 Claims, No Drawings

METHOD OF MAKING BREAD PRODUCTS WITHOUT SHORTENINGS AND/OR OILS

BACKGROUND OF THE INVENTION

The present invention relates to a method or process of making bread products using various types of processed and unprocessed, hulled and hulless, waxy barley flours to replace shortenings and/or oils.

Food products made from waxy barley is known in the ark. But, food products such as bread has always been made using animal shortenings and/or vegetable oils which enhanced the taste of the bread and acted as a lubricant and as a binder. Nowhere has waxy barley been used as a substitute in place of the animal shortenings and/or vegetable oils which resulted in the food product having a high fat content, becoming stale, having a reduced shelf life, and having to be used in conjunction with artificial preservatives.

One known prior art is a METHOD OF PREVENTING RETROGRADATION OF FOODSTUFFS, U.S. Pat. No. 4,690,829, INVENTOR: TAKAYUKI USUI, which used waxy barley starch as part of the starchy material and which added a polysaccharide to the starchy material but which did not substitute and did not suggest substituting the waxy barley starch for shortenings and/or oils.

Another known prior art is a PROCESS FOR PRODUCING A FAT-SUBSTITUTE BAKERY DOUGH AND THE FAT SUBSTITUTE BAKERY PRODUCTS, U.S. Pat. No. 5,344,663, INVENTOR: ANNE M. JEWELL, which comprises a wheat flour, potato flour, non-fat dry milk solids, emulsifying binders such as molasses and corn syrups, and a leaving agent to produce essentially fat-free bakery products unlike the present invention which uses waxy barley flour in place of shortenings and/or oils to produce fat-free bakery products.

None of the prior art describes using waxy barley as a substitute for animal shortenings and/or vegetable oils. Even in the patent which used waxy barley starch, animal shortenings and/or vegetable oils were still used to make the foodstuffs. Nowhere in the prior art has it been suggested that waxy barley can effectively be used as a substitute of the conventionally used animal shortenings and/or vegetable oils to preferably make or bake bread products.

SUMMARY OF THE INVENTION

This invention relates to a process or method of making or baking leavened bread products without shortenings and/or oils which have been one of the staple or prime ingredients used especially for making or baking bread products. Hulled and hulless waxy barley has been used as a replacement for the shortenings and/or oils in bread products.

One objective of the method of making bread products without shortenings and/or oils is to make healthier bread products having zero fat content.

Another objective of the method of making bread products without shortening and/or oils is to produce bread having a longer shelf life.

Also, another objective of the method of making bread products without shortenings and/or oils is to produce bread having a high volume of moisture for preventing the drying out of the bread.

Yet, another objective of the method of making bread products without shortenings and/or oils is to produce bread without preservatives.

Further objectives and advantages of the present invention will become apparent as the description proceeds and when taken in conjunction with the accompanying drawings wherein:

DETAILED DESCRIPTION OF THE INVENTION

Through intensive research and testing, a method of making bread products without animal shortenings and/or oils was developed using processed and unprocessed, hulled and hulless or nonhulled waxy barley in place of the shortenings and/or oils which resulted in bread products having a high moisture content. The waxy barley fibers hold and absorb moisture throughout the bread baking process and into the finished product. It wasn't until recently that waxy barley, a crop plant, has been successfully grown in the United States. Prior to this, waxy barley was known only in countries in the Orient such as China Korea, and Japan. Waxy barley flour is produced from a variety of waxy barleys and is characterized by having soluble fiber which has a high viscous state especially when used in the baking of breads. The high viscous state of the soluble fiber of the waxy barley flour is believed to be the reason why the waxy barley flour can be successfully substituted for animal shortenings and/or vegetable oils which prior to this invention, were the staple ingredients for bread products. The soluble fibers in the waxy barley flours are capable of absorbing and holding high volumes of moisture which are needed to keep the bread products fresh and to prevent the bread products from becoming stale and drying out.

Waxy barley flour is essentially made from hulled and hulless or nonhulled, processed and unprocessed waxy barley including berries which are either heat treated or left untreated. The waxy barley flour made from heat treated berries retained more moisture than the waxy barley flour made from untreated berries. Further, the waxy barley flour made from the hulless variety of waxy barley retained 10 to 15 percent more moisture than the hulled variety of waxy barley.

In making bread products, the waxy barley flour used in place of the animal shortenings and/or vegetable oils should be in the range of 15 to 40 percent by weight of the total material used in the recipe or the bread dough to make the bread products. Concentrations higher than 40 percent by weight of the waxy barley flour in the total recipe of the bread dough results in the bread dough retaining too much moisture and becoming essentially uncontrollable. Concentrations lower than 15 percent by weight of the waxy barley flour in the total recipe results in the bread dough being too dry. Further, two different types of barley bread bases were used to make the bread products, and both barley bread bases contained waxy barley flour in the range of 35 to 60 percent by weight of the total bread bases. A barley white bread base was made by using both hulled and hulless, processed or heat treated and unprocessed waxy barley and also includes wheat flour, wheat gluten, dextrose, salt, diacetyl tartaic acid esters of mono-diglycerides (DATEM), mono-diglycerides, soy flour, lecithin, calcium salts, ascorbic acid, azodi-carbonamide, carbamide, vegetable powder, fungal amylase, and sodium stearoyl lactylate, and a barley wheat bran bread base was made by using the same varieties of waxy barley and adding wheat bran for added texture, taste, and color and also includes wheat bran, wheat flour, wheat gluten, dextrose, salt, diacetyl tartaic acid esters of mono-diglycerides (DATEM), mono-diglycerides, soy flour, lecithin, calcium salts, ascorbic acid, azodi-carbonamide, carbamide, vegetable powder, fungal amylase, and sodium stearoyl lactylate. A good bread dough can be achieved from combining or mixing 50 pounds of the barley bread base either white or wheat bran with 100 pounds of wheat bread flour, 110 to 120 pounds of water, and yeast minus animal shortenings and/or vegetable oils.

EFFECTS OF THE INVENTION

This invention can be applied to various types of conventional leavened bread baked items such as white bread loaves, bran bread loaves, hamburger buns, dinner buns, bread sticks, cinnamon rolls, and cinnamon crisps. Hence, animal shortenings and/or vegetable oils can be readily and totally replaced by waxy barley flours to produce bread products which are soft, elastic, digestible and have good quality texture without the fats effected by the shortenings and/or oils.

(EXAMPLE 1)

White bread loaves were produced using a conventional baking method and using the following recipe. All ingredients are expressed in pounds:

| Barley white bread base | 5 lbs. |
|---|---|
| Wheat bread flour | 10 lbs. |
| Water | 10–12 lbs. |
| Yeast (Red Star Cake) | ¾ lbs. |

To keep this product essentially fat free, flour was used to coat the mixing bowl instead of oil. Loaves were baked in glazed pans. The dough was mixed 12 to 18 minutes with temperatures maintained between 78 to 80 degrees Fahrenheit. After mixing, the dough was scaled to 19 ounces loaf weight and rounded up. The dough was allowed to rest for 10 to 15 minutes before it was molded into a loaf shape. The loaves were baked at 380 to 400 degrees Fahrenheit for 30 to 32 minutes which resulted in essentially fat-free finished products.

(EXAMPLE 2)

White 2 ounce hamburger buns were produced using a conventional baking process and using the following recipe:

| Barley white bread base | 5 lbs. |
|---|---|
| Wheat bread flour | 10 lbs. |
| Water | 10–12 lbs. |
| Yeast (Red Star Cake) | ¾ lbs. |

After mixing in a bowl lined with flour instead of oils and/or shortenings for 12 to 18 minutes with the dough temperatures maintained between 78 and 80 degrees Fahrenheit, the dough was scaled into 2 ounce portions. The portions were then rounded up and rested for 10 to 15 minutes. The portions were then rounded up again and placed on pans with liners. The buns were then flattened and placed on racks to proof. The buns were baked to 375 to 400 degrees Fahrenheit for approximately 15 to 18 minutes which resulted in essentially fat-free buns.

(EXAMPLE 3)

White 1.3 ounce dinner rolls were produced using a conventional baking method and using the following recipe:

| Barley white bread base | 5 lbs. |
|---|---|
| Wheat bread flour | 10 lbs. |
| Water | 10–12 lbs. |
| Yeast (Red Star Cake) | ¾ lbs. |

After mixing these ingredients in a bowl lined with flour instead of oil for 12 to 18 minutes with the dough temperatures maintained between 78 and 80 degrees Fahrenheit, the dough was scaled into 1.3 ounce portions. The portions were rounded up and rested for 10 to 15 minutes, and then rounded up again and placed on lined baking pans. The rolls were placed on racks to proof for several minutes. These rolls were baked at 375 to 400 degrees Fahrenheit for approximately 13 to 15 minutes.

(EXAMPLE 4)

White 1.6 ounce bread sticks were produced using a conventional baking process and using the following recipe:

| Barley white bread base | 5 lbs. |
|---|---|
| Wheat bread flour | 10 lbs. |
| Water | 10–12 lbs. |
| Yeast (Red Star Cake) | ¾ lbs. |

After mixing these ingredients in a bowl lined with flour instead of oil for 12 to 18 minutes with the dough temperatures maintained between 78 and 80 degrees Fahrenheit, the dough was scaled into 1.6 ounce portions. The portions were rounded up and rested for 10 to 15 minutes, and then rounded up again and placed on lined baking pans. The bread sticks were placed on racks to proof for several minutes, and then baked at 375 to 400 degrees Fahrenheit for approximately 13 to 15 minutes.

(Example 5)

White 2.5 ounce cinnamon rolls were produced using a conventional baking process and using the following recipe:

| Barley white bread base | 5 lbs. |
|---|---|
| Wheat bread flour | 10 lbs. |
| Water | 10–12 lbs. |
| Granulated sugar | 1 lbs. |
| Yeast (Red Star Cake) | ¾ lbs. |
| Cinnamon | ½ oz. |

After mixing the base, flour, water, and yeast ingredients in a bowl lined with flour instead of oil for 12 to 18 minutes with the dough temperatures maintained between 78 and 80 degrees Fahrenheit, the dough was rolled flat and sprinkled with sugar and cinnamon. The dough was then rolled up and scaled into 2.5 ounce portions. The portions were placed on lined baking pans and rested 10 to 15 minutes before baking at 375 to 400 degrees Fahrenheit for approximately 13 to 15 minutes.

(EXAMPLE 6)

Wheat bran loaves were produced using a conventional baking process and using the following recipe:

| Barley with bran bread base | 5 lbs. |
|---|---|

| | |
|---|---|
| Wheat bread flour | 10 lbs. |
| Water | 10–12 lbs. |
| Yeast (Red Star Cake) | ½ lbs. |

After mixing the base, flour, water, and yeast ingredients for 12 to 18 minutes, the mixing bowl was lined with flour instead of oil to aid in the removal of the dough from the bowl. Dough Temperatures were maintained between 79 degrees and 80 degrees Fahrenheit. After mixing, the dough was scaled to approximately 19 ounces and rounded up. The dough was rested for 10 to 15 minutes, and then molded into loaves and baked in glazed pans at 380 to 400 degrees Fahrenheit for approximately 30 to 32 minutes.

(EXAMPLE 7)

Wheat bran 2 ounce hamburger buns were produced using a conventional baking method and using the following recipe:

| | |
|---|---|
| Barley with bran base | 5 lbs. |
| Wheat bread flour | 10 lbs. |
| Water | 12 lbs. |
| Yeast (Red Star Cake) | ½ lbs. |

The ingredients were mixed 12 to 18 minutes with the dough temperatures maintained between 78 and 80 degrees Fahrenheit. The dough was removed from the mixing bowl using flour instead of oil to separate the dough from the bowl. The dough was scaled into bun portions, rounded up, rested for 10 to 15 minutes, and then rounded up again and placed on lined pans. The dough was flattened and allowed to proof for several minutes before baking for approximately 15 to 18 minutes at 375 to 400 degrees Fahrenheit.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A method of making bread products without using shortenings and/or oils comprising:

substituting waxy barley flour for said shortenings and/or oils in bread dough which is baked to make bread products.

2. A method of making bread products without using shortenings and/or oils as described in claim 1, which further includes mixing said waxy barley flour in a bread base such as a white bread base or a bran bread base, and then mixing said bread base with wheat flour, water, and yeast to make said bread dough for making said bread products.

3. A method of making bread products without using shortenings and/or oils as described in claim 2, wherein said waxy barley flour is made from processed and unprocessed, hulled and nonhulled waxy barley.

4. A method of making bread products without using shortenings and/or oils as described in claim 3, wherein said bread base includes an amount of waxy barley flour in the range of 35 to 60 percent by weight of said bread base.

5. A method of making bread products without using shortenings and/or oils as described in claim 4, wherein said bread dough comprises waxy barley flour in the range of 15 to 40 percent by weight of said bread dough for making said bread products.

* * * * *